(12) United States Patent
Lukac-Kuruc et al.

(10) Patent No.: US 7,139,309 B2
(45) Date of Patent: Nov. 21, 2006

(54) PROCESS TO EXPAND DATA DENSITY

(76) Inventors: Eric Lukac-Kuruc, Stationstraat, 24, B-1861 Meise (BE) 1861; David Herscovitch, avenue Pastur, 134, Brussels (BE) 1180

( * ) Notice: Subject to any disclaimer, the term of this patent is extended or adjusted under 35 U.S.C. 154(b) by 1051 days.

(21) Appl. No.: 09/755,333

(22) Filed: Jan. 5, 2001

(65) Prior Publication Data

US 2002/0061060 A1    May 23, 2002

(30) Foreign Application Priority Data

Nov. 17, 2000   (EP)   ................... 00870275

(51) Int. Cl.
*H04B 1/38*    (2006.01)
(52) U.S. Cl. .............. 375/220; 375/240; 375/260; 375/356; 370/505; 370/506
(58) Field of Classification Search ............... 375/220, 375/240, 260, 283–286, 344, 356, 362; 370/506, 370/505, 535, 537; 379/142.01, 142, 157, 379/245, 339; 84/645
See application file for complete search history.

(56) References Cited

U.S. PATENT DOCUMENTS 5,754,635 A * 5/1998 Kim ................. 379/142.01
5,880,391 A * 3/1999 Westlund .............. 84/645

FOREIGN PATENT DOCUMENTS

JP        10126818      *  5/1998

OTHER PUBLICATIONS

MIDI, the Musical Instrument Digital Interface Standard, Oct. 1994, pp. 1-3.
UART (Universal Asynchronous Receiver/Transmitter), Atmel Document: ref. 1042D-04/99, At 90S/LS2333 and AT90S/LS4433 Microcontrollers, pp. 44-50.

* cited by examiner

*Primary Examiner*—Mohammed Ghayour
*Assistant Examiner*—Edith Chang
(74) *Attorney, Agent, or Firm*—Morgan Lewis & Bockius LLP (57) ABSTRACT

A process for transmission of information between at least two devices comprises: generating a serial message coded by means of a time sequence of binary transitions called bits; reducing the time length of all bits in the message by changing them into shorter bits, in order to insert additional bits whose half duration falls at the moment in time where the transitions between unchanged bits occurred when no additional bits are inserted; keeping the half duration point of all reduced data bits to the same place as they were in the unchanged message; keeping the total duration of the message containing the additional bits identical to the total length of the unchanged message. The process is compliant with the MIDI standard and allows the increase of the amount of various distinct messages which it is able to convey.

9 Claims, 6 Drawing Sheets

PROCESS TO EXPAND DATA DENSITY

BACKGROUND OF THE INVENTION

1. Field of the Invention

The invention relates to a process for transmitting information over an electrical or optical support. It deals more specifically with the transmission of digital information flowing serially in a time sequence over the support.

2. Brief Description of the Background of the Invention, Including Prior Art

It is known for a long time to transmit information in serial sequence over an electrical support with various methods. For instance, numerous processes and systems are known for the purpose of transmitting information between musical instruments according to the MIDI interface standard (Musical Instruments Digital Interface, MIDI Manufacturers Association, The complete MIDI 1.0 detailed specification", document version 95.1 section 2 embedding 2:doc version 4.2, October 1994 pages 1 to 3). Due to the MIDI specification requiring the use of optoisolators, the information is also conveyed as light modulation. Frequently, according to the coding of the information peculiar to the transmission process considered, it is not uncommon to be limited by the number of different coded messages the transmission process can pass along over the support. In the case of the MIDI standard, for instance, one quickly comes up against the absolute limit of 16 addresses (also called channels) of various distinct instruments that the system is able to cope with.

It is therefore desirable to expand the data density of the transmitted information, while keeping the previous admitted standard for transmitting the information, by "superposing" the additional information.

SUMMARY OF THE INVENTION

1. Purposes of the Invention

The invention aims to remedy the drawbacks of the known processes by offering a process that allows increasing the amount of various distinct messages the system is able to convey while maintaining the compatibility with existing systems.

In the present context a message is defined as a series of bits corresponding to one or more instructions and/or to an address.

2. Brief Description of the Invention

To this end, the invention deals with a process for the transmission of a larger quantity of information between at least two devices according to which the elements of information which are succeeding each others in time are passed along over an electrical or optical support, said information elements being made of a packet of binary transitions forming bits, said bits being assembled in messages which comprises one or more data and/or addresses of the devices for which these data are intended, while said process remains unobtrusive to pre-existing systems and nevertheless allows the increase of the amount of various distinct messages the system is able to convey.

The invention is making use of the peculiarities of the methods commonly used to recognize a message in order to add supplemental information in a non-obtrusive manner.

According to the invention, additional binary bits are inserted between the bits forming the initial message. The positioning and time length are chosen in order to avoid the recognition by the usual known methods of message retrieving. Said methods of message retrieving are based on a logic circuitry called UART (Universal Asynchronous Receiver/Transmitter, see for example Atmel Document: ref 1042D-04/99/xM about AT902333 & 4433 microcontrollers, embedded UART pages 44 to 50).

Only a receiver based on message reading according to the invention will be able to retrieve the entire content of the message including the additional bits.

By information, it is intended to designate any message in which the semantic content may be coded.

According to the invention, devices are information transmitters, information receivers, or combined information transmitters and receivers (transceivers).

According to the invention, the information elements are succeeding each other in time over an electrical or optical support. By "succeeding each other", it is meant a transmission of the information elements one by one in a time sequence, any element using alone the whole information capacity of the support. By electric support, there is meant any means able to convey an electrical signal from a point to another. Those supports will be mostly realized by means of one or more electric conductors under the form of one or more wires isolated between them and assembled in a cable terminated by connectors. The coding of information over the electric support can be done by any known way. It may, for instance, be realized by means of a voltage, of a current, of a phase or of any other way compatible with the support. By optical support, we mean any means able to convey photons from a point to another. One or more optical material or assembly of materials, or even empty space will mostly realize those supports.

According to the invention, the information elements are made of a set of binary transitions, called bits, succeeding each other in time. When the coding of the information is done by means of a voltage, a binary transition is performed by a sudden jump from the rest-voltage to the on-voltage (active state) or conversely from the on-voltage to the rest-voltage. Things go similar when the coding is realized through other means. Sets of bits, form messages dedicated to the devices connected over the electrical or optical support.

An advantageous coding scheme of the binary information flowing over the electrical support is a coding done by means of a current. According to this coding scheme, the two binary levels are materialized by the presence or absence of a current. It does not matter whether the binary level 1 is materialized by the absence or by the presence of the current. Practically, a realization having shown good results is the one wherein the binary level 1 is materialized by the absence of current and the binary level 0, by its presence.

According to the invention, additional bits are inserted between the bits of an original message. Each of the additional bits is centered at the moment of time which was one of transition between bits in the original message. The amount of supplementary variations in messages allowed by the insertion of binary bits in a system wherein the messages comprises n bits in series is given by the following formula:

$$n_{sup} = 2^{(n-1)}$$

Where n is an integer value giving the number of bits in the original message.

The invention appears particularly advantageous when it is applied for the communication of data related to musical equipment according to the MIDI communication standard. According to this use, a 5 mA current coding is used for the logic level 0 and said current is stopped for the logic level 1. The basis frequency of such a MIDI communication system is of 31250 Baud and relies on an asynchronous transmission protocol, each message comprising a bit setting the beginning of the message ("start-bit" at the active state, i.e. the state 0), 8 data bits and one bit for the end of the message ("stop-bit" at the rest state, i.e. the state 1).

Similarly, because the MIDI communication standard requires the use of opto-isolators, the electrical coding is implicitly converted inside these opto-isolators to optical coding where a logic level 0 is represented by a photon flow between the built-in light-emitting diode and the phototransistor, and a level 1 by the absence of photons.

According to the MIDI standard, the connectors located at the end of the cables of the information support are normalized 5 pin DIN connectors (180 degrees). The pins labelled 4 and 5 are used for the connection of the current loop conveying the information; the pin 2 is not connected (case of a "MIDI in" port) or is connected to the cable shielding (case of a "MIDI OUT" or "MIDI THRU" port). The pins 1 and 3 are not connected.

The invention concerns also a system for the communication of information in accordance with the process of the invention and for its use for the communication of information related to the operation of musical devices according to the MIDI standard.

DESCRIPTION OF INVENTION AND PREFERRED EMBODIMENT

Figure 1:
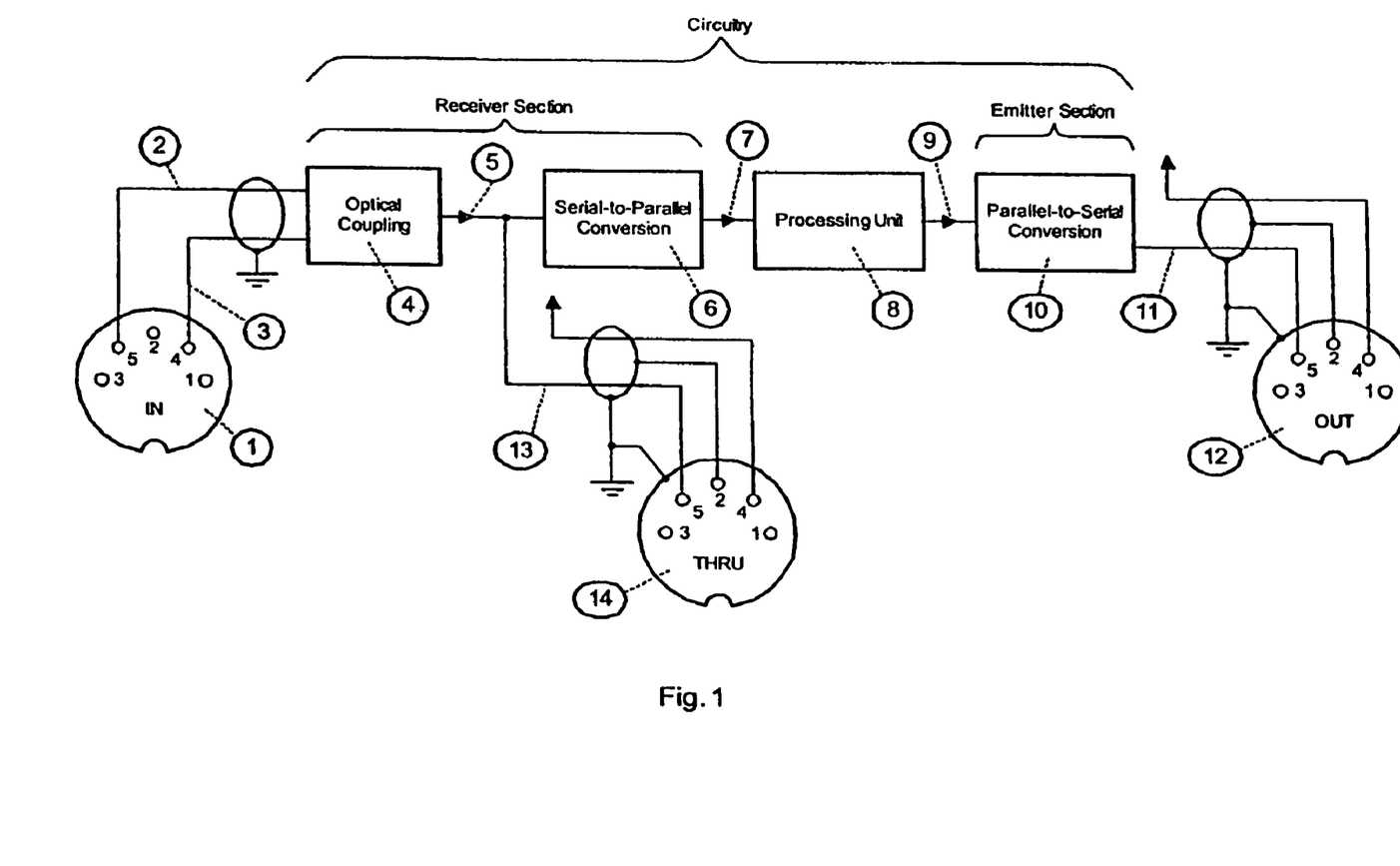
FIG. 1 shows a schematic device of the state of the art and is also used to illustrate the practical implementation of the present invention.

FIG. 1 shows a device according to the state of the art; it is further used to show the practical embodiment of the present invention. The information flowing over the support enters the device through pins 4 and 5 of the normalized DIN connector 1 (labelled IN) connected to an optocoupler 4 via the connections 2 and 3. The flow of binary transitions 5 coming out of optocoupler 4 is then sent to a serial-to-parallel converter 6 which is de-serializing the information in order to assemble the messages. The latter are sent via connection 7 to processing unit 8. The information generated by the processing unit 8 are sent via connection 9 to be serialized in parallel-to-serial converter 10 which is connected to pin 5 of DIN connector 12 (labelled OUT) via connection 11.

DIN connector 14 (labelled THRU) has its pin 5 connected to the signal coming from the optocoupler 4 via connection 13.

Figure 2:
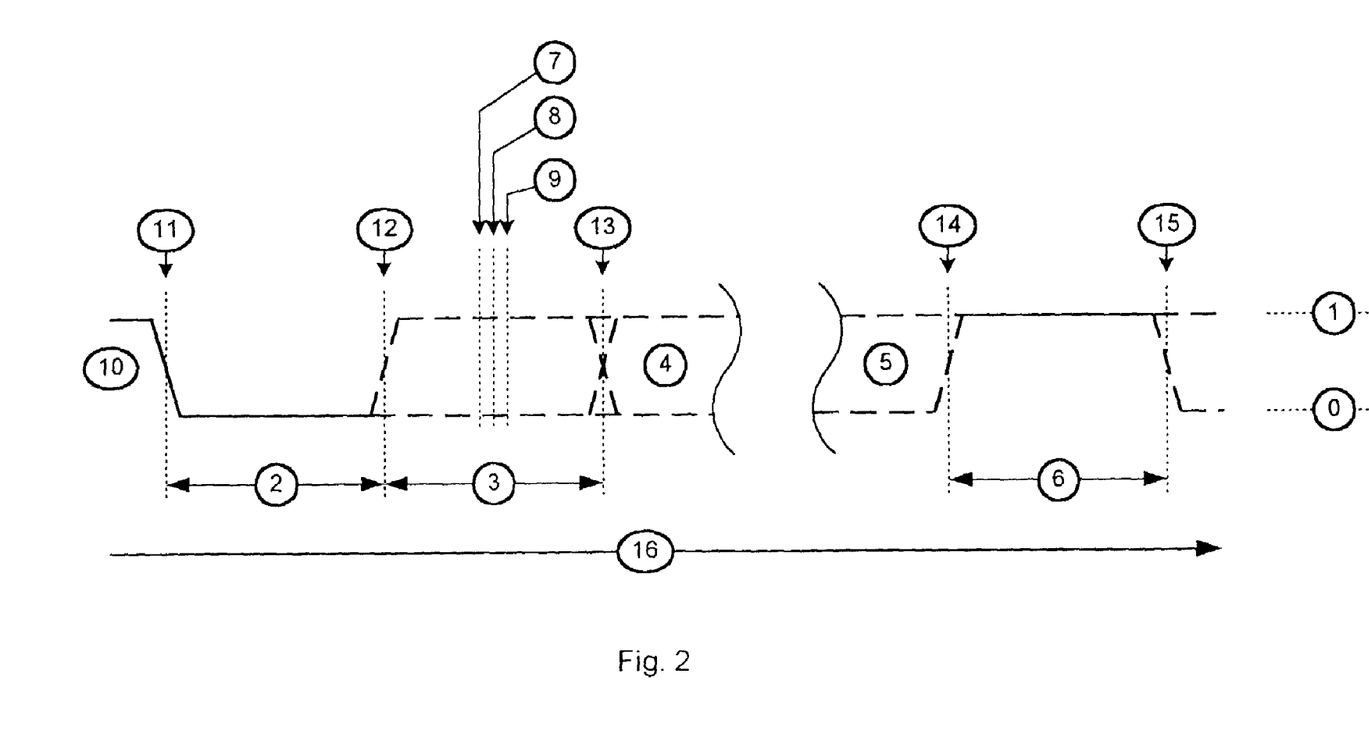
FIG. 2 shows the timing sequence of a serial data transmission according to the state of the art

FIG. 2 shows the timing sequence of a asynchronous serial transmission according to the state of the art. The time flow is represented by arrow 16. The logical state 1 corresponds to level 1. The logical state 0 corresponds to level 0.

According to the state of the art, a typical message comprises a Start Bit 2, several Data Bits 3-4-5, and a Stop Bit 6. Starting from the rest state 10 which is at logic level 1, the Start Bit is initiated by a transition 11 from level 1 to level 0. Level 0 is maintained for duration 2; the combination of this transition 11 and duration 2 represents the Start Bit. At the end of duration 2 a level transition 12 may possibly occur to set the level of the first Data Bit 3 of the message. A Data Bit can be either level 0 or level 1. At the end of duration 3, whose length is equal to duration 2, a level transition 13 may possibly occur to set the level of the second Data Bit 4 of the message. It goes similarly for the following Data Bits up to the last Data Bit 5 of the message, at the end of which 14 the logical level must go to level 1 for a duration 6 whose length is also equal to all other bits 2 to 5 of the message. This bit 6 at level 1 is the Stop Bit, at the end of which 15 a level transition from 1 to 0 may possibly occur to initiate the Start Bit of the next message. Alternatively, at moment 15 at the end of the Stop Bit 6, the level can be maintained to level 1 at a rest state.

In order to read the content of the message, the signal is sampled at predefined time intervals. Typically, the receiving devices is synchronizing with the incoming message with a resolution which is 16 times finer than the duration of a bit, here called the clock duration or Clock. After the Start Bit transition 11 is detected, the first Data Bit value will be known by sampling the signal 24 Clocks after transition 11. This sampling moment corresponds to the middle of the duration of the first Data Bit. From then on, the subsequent Data Bits will be sampled at 16 Clock intervals up to and including the last Data Bit 5, from where another 16 Clock interval will occur before sampling the Stop Bit to ensure it is effectively at level 1 and that the whole message is reliable.

An improved method compared to the one described hereabove is relying on a triple sampling of the bits. In this method, each bit to be sampled is sampled, for example, a first time 7 at, assuming the above typical synchronization, 7/16th of its total duration, the second 8 and third 9 sampling occurring then respectively at 8/16th and 9/16th of the total bit duration. The three values obtained are processed through a majority vote to determine the value of the bit.

The purpose of this triple sampling is to avoid a false reading due to a possible glitch during the signal transmission, in which case the probability is high to have only one of three samples presenting a faulty value. It should be noted that the second sampling, appearing at 8/16th, is corresponding to the single sampling of the original unimproved method described above.

Figure 3:
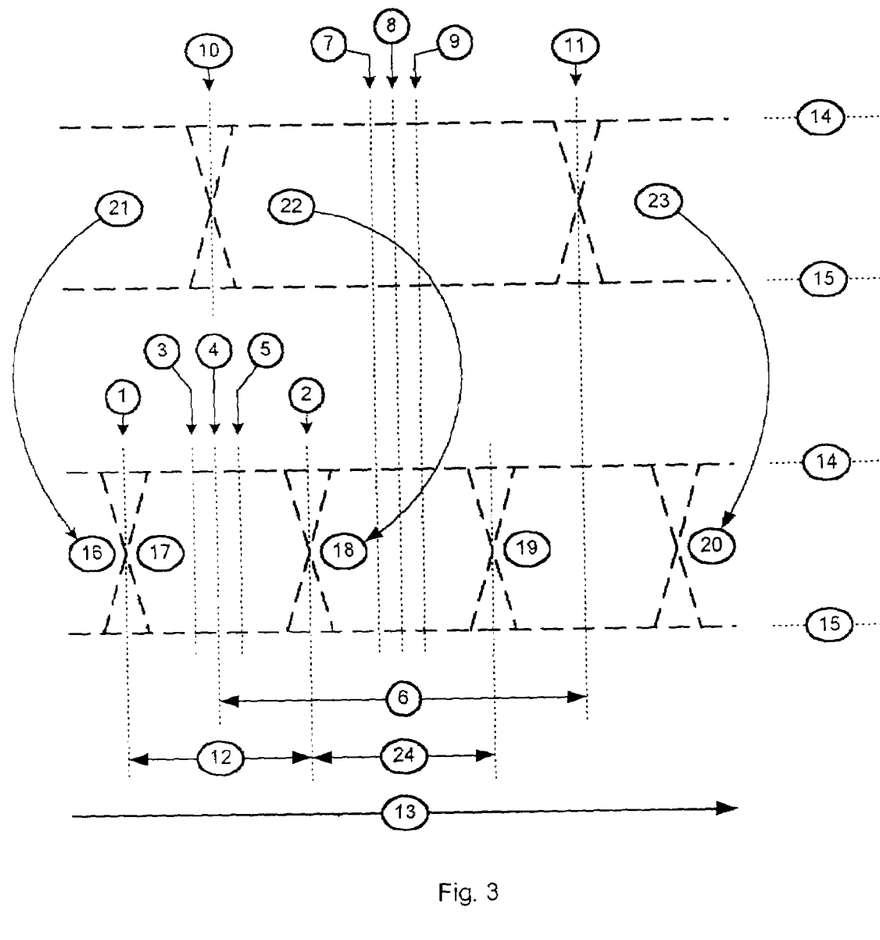
FIG. 3 shows compared timing sequences with and without additional bits inserted according to the invention, with the associated sampling methods

FIG. 3 deals with the heart of the invention and shows the timing of an enriched message (16 to 20). An enriched message is a message that, according to the invention, contains additional bits 17 and 19. The bits 21 to 23 are forming a basic message according to the state of the art and are called hereafter Basic Data Bits. The time flow is represented by arrow 13. The logical state 1 corresponds to level 14. The logical state 0 corresponds to level 15. In the basic message (21 to 23), a bit 22 is a level (14 or 15) for the duration 6 between the possible transitions 10 and 11. Points 7, 8 and 9 represent the typical triple sampling as described in the discussion of FIG. 2.

The enriched message (16 to 20) shows how additional bits 17 and 19 are added to the basic message. In this enriched message, the duration 6 of bit 22 is reduced to duration 24, which is half of initial duration 6 and becomes bit 18. Similarly, bit 21 is reduced to become bit 16 and bit 23 is reduced to become bit 20. It is important to note that bit 21 may be a Data Bit similar to bit 22 but may also be the Start Bit. Likewise, bit 23 may be a Data Bit similar to bit 22 but may also be the Stop Bit. This time reduction of the bit lengths makes room for additional bits.

According to the invention, additional bits can only be inserted between Basic Data Bits, between the Start Bit and the first Basic Data Bit or between the last Basic Data Bit and the Stop Bit.

In the above example, an additional bit 17 appears centered around the transition 10 between what were previously bit 21 and bit 22, now respectively bit 16 and bit 18; bit 19 is added similarly between bit 22 and bit 23, now respectively bit 18 and bit 20.

In the following description, legacy devices are defined as data transmission devices being able to transmit and receive basic messages only; we define new devices as data transmission devices being able to transmit and receive both basic and enriched messages.

The purpose of the invention is to allow the addition of bits to an existing message in a transparent manner so that legacy (prior art unadapted) receiving devices will be unaffected by the enriched message while still reading the basic message contained within the enriched message.

This allows the use of both legacy devices and new devices implementing the invention, where basic messages and enriched messages can be exchanged between any of these device type, where basic and enriched messages can be recognized by new devices while enriched messages won't impede the legacy devices from recognizing the basic messages embedded within the enriched messages.

This is made possible by the fact that the triple sampling (7 to 9) of the bit 22 in the basic message (21 to 23) remains effective when sampling bit 18 in the enriched message (16 to 20) while, at the same time, an additional triple sampling (3 to 5) will read the content of additional bit 17. Practically, additional bits 17 and 19 have the same duration 12 as the now reduced basic bits 24. In all these bits, samplings now occur at ⅜th, 4/8th and ⅝th of their duration. The FIG. 3 example is built on a bit length reduction to a half, where additional bits have a length similar to the basic bits after the latter are reduced.

Other proportions of length reduction can be applied to achieve similar result. For instance, a reduction of the basic bits to 60% of their initial length will imply additional bits with a duration equaling 40% of a basic bit duration. Such option might be preferred when reading methods different than the triple sampling method described previously are chosen. Any other value for the percentage of reduction can be used to implement the invention.

Figure 4:
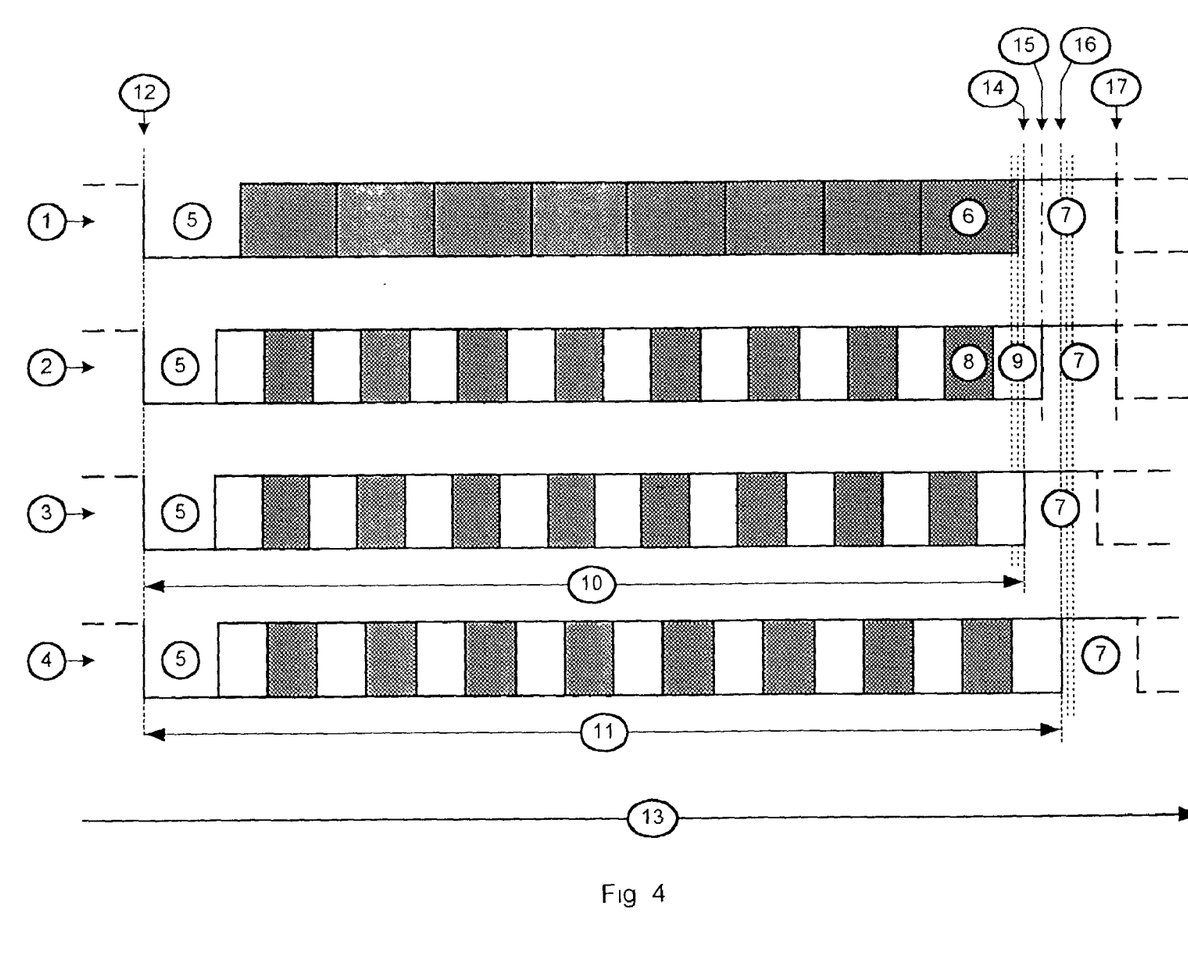
FIG. 4 shows compared timing sequences of a complete message according to the state of the art, a complete message according to the invention, two timing variations of the latter.

FIG. 4 illustrates the effect of clock speed discrepancies between a transmitter and a receiver applying the invention. It also helps understand the mathematics revealing the limits of such clock discrepancies. The time flow is represented by arrow 13. The message 1 is a basic message according to the state of the art with its Start Bit 5, several Data Bits such as Data Bit 6 and a Stop Bit 7. The message 2 is an enriched message according to the invention and using a basic data bit duration reduction of 50% with its Start Bit 5, several Data Bits reduced in length as explained in FIG. 3 such as Data Bit 8 and several additional bits also as explained in FIG. 3 such as additional bit 9; it also ends with a Stop Bit 7. The message 3 has the same structure as message 2 but only at a faster clock rate implying an overall shorter message. The message 4 has the same structure as message 2 but only at a slower clock rate implying an overall longer message.

When there is no clock difference between the transmitter and the receiver, the triple sampling method already described falls perfectly centered in all Data Bits, both Basic and Additional, and that the triple sampling of the Stop Bit occurs at ⅜th, 4/8th and ⅝th of its now reduced time duration as the theory in FIG. 3 implies. When there is a discrepancy between transmission and reception clock rates, there is a risk that the triple sampling of the last Data Bit or the triple sampling of the Stop Bit fall out of range. This fact, which also exists in legacy communication systems, leads however to acceptance of a smaller clock discrepancy when applying the invention due to the narrower bit durations. Practically, where all bits in legacy messages are 16 Clock long, the enriched message according to the invention will have its Data Bits 8 Clock long, its Start and Stop Bits 12 Clock each. According to these metrics, a legacy message 1 of eight Data Bits such as Data Bit 6 is 160 Clocks long from 12 to 17 (8×16 Clocks+Start Bit 5=16 Clocks, +Stop Bit 7=16 Clocks). According to the same metrics and using for this example a bit reduction of a half (50%), an enriched message 2 of eight Basic Data Bits such as Data Bit 8 and nine Additional Bits such as Additional Bit 9 is 160 Clocks long from 12 to 17 ((8+9)×8 Clocks+Start Bit 5=12 Clocks+Stop Bit 7=12 Clocks).

A typical triple sampling method as explained in FIG. 3 will imply that the last sampling 14 of the last additional bit 9 in message 2 will occur at 145 clocks in reference to time 12. The calculation is: Start Bit=12 Clocks+(8 Basic Data Bits×8 Clocks)+(8 Additional Data Bits×8 Clocks)+5 Clocks. In the same message 2, the transition 15 marks the end of the last additional data bit 9 and at the same time the beginning of the Stop Bit 7. This transition 15 occurs at 148 Clocks. The calculation is: Start Bit=12 Clocks+(8 Basic Data Bits×8 Clocks)+(9 Additional Data Bits×8 Clocks). In the same message 2, the first sampling 16 of the triple sampling of the Stop Bit 7 occurs at 151 Clocks. The calculation is: Start Bit=12 Clocks+(8 Basic Data Bits×8 Clocks)+(9 Additional Data Bits×8 Clocks)+3 Clocks.

The shorter total duration of message 3 compared to message 2 can be the result of a sender being faster than the receiver or a receiver being slower than the sender; in both cases, there is a risk that the last sampling 14 of the last additional data bit 9 which normally occurs after the duration 10, falls at the transition between the last additional data bit 9 and the Stop Bit 7. To keep the entirety of the triple sampling of the last additional data bit 9 within functional limits, the transmitter speed can not be faster than (1/(1/148×145))=1,020689 . . . times the receiver speed.

The longer total duration of message 4 compared to message 2 can be the result of a sender being slower than the receiver or a receiver being faster than the sender; in both cases, there is a risk that the first sampling 16 of the Stop Bit 7 which normally occurs after the duration 11, falls at the transition between the last additional data bit 9 and the Stop Bit 7. To keep the entirety of the triple sampling of the Stop Bit 7 within functional limits, the receiver speed can not be slower than (1/(1/148×151))=0,980132 . . . times the transmitter speed.

A practical implementation of the invention compliant with the MIDI standard is also relying on FIG. 1 where all elements are similar to the state of the art to the exception of block 6 where the serial to parallel conversion is not effected by a standard off-the-shelf UART (Universal Asynchronous Receiver-Transmitter) but by a fast microcontroller (brand Scenix, type SX-18) wherein software routines take in charge all the necessary signal recognition and samplings. Similarly, the block 10, parallel to serial conversion, is also not effected by a UART, but by another set of software routines running within the same SX-18 microcontroller. As in MIDI, the total duration of a message is 320 microseconds, the connectors 1, 12 and 14 are of type 5 pin DIN 1800 female, voltage levels are TTL compliant, optocoupler is of brand Sharp, type PC 900.

The above example intends to describe the invention in a practical application without however limiting its scope which is not limited to the MIDI environment.

According to another aspect of the invention, to overcome the narrow allowance in speed discrepancy when using the triple sampling method, there is disclosed another way of retrieving the signal.

Figure 5:
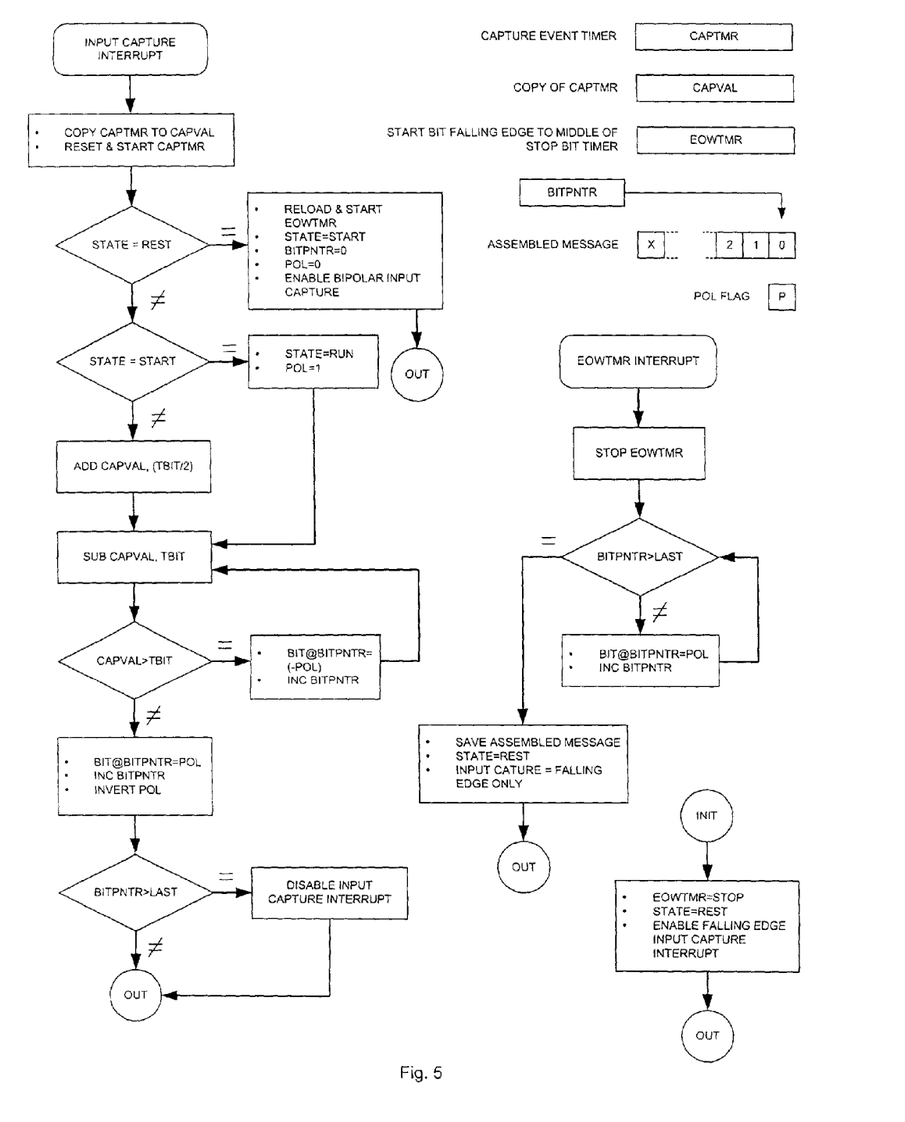
FIGS. 5 and 6 illustrate a new method for retrieving the signal by comparing the changes in the signal against timing references.
Figure 6:
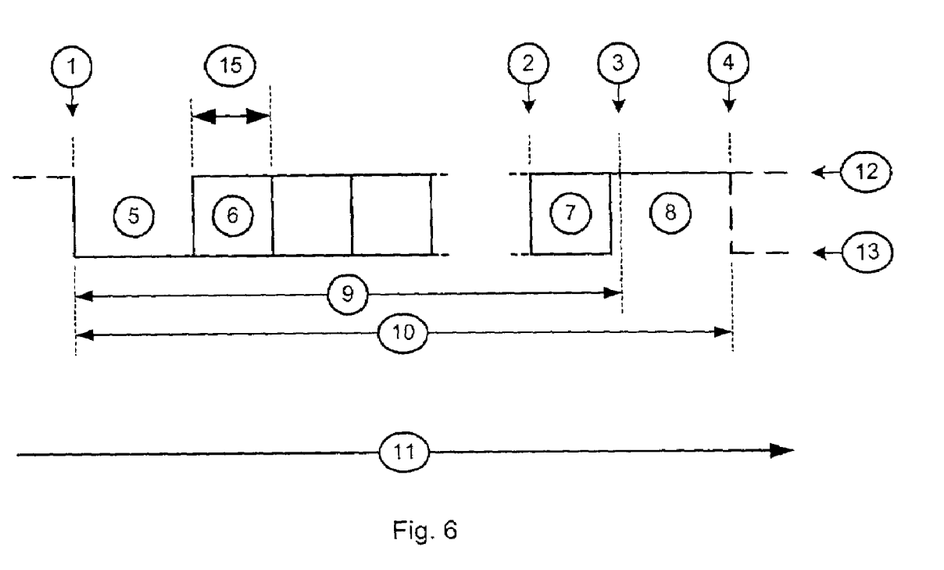

This method is described with reference to FIGS. 5 and 6, the numbers in the text are referring to FIG. 6 only.

In this new method, the signal is not checked during the stable phase of the individual bits, but by comparing the changes in the signal against timing references. The method according to this embodiment of the invention can be implemented in a microcontroller, relying on built-in peripherals and program execution, or in hardware only, using standard logic and counters.

In both cases, two timer/counters are used: the first, called CAPTMR, is restarted each time a level change is detected. The second one, called EOWTMR, is used in determining the end of the message in case there are no level changes to make the last bit or bits of the message.

Whichever the implementation (hardware or software), the following hardware functional blocks are required:

An input pin must be able to trigger the storage of a counter/timer value into a register. This counter/timer is an up-counter called CAPTMR (Capture TiMeR). The mentioned triggering must be able to generate an interrupt for software processing or activation of the required circuit in case of hardware-only implementation. The interrupt must be maskable. The counter/timer must be restartable. Its count duration must be long enough to equal the duration of the EOWTMR. The triggering must be selectable between 3 modes: disabled, falling edges only, falling and rising edges Another counter/timer, called EOWTMR (End Of Word TiMeR) is a down-counter used to determine the end of the message. This counter/timer must be able to count to a time point 3, somewhere within the Stop Bit, and whose exact value will be explained later. It must generate an interrupt at the end of count. This interrupt must be maskable.

A register, called CAPVAL, to copy and manipulate the value initially captured in CAPTMR A register, called ASSEMBLED MESSAGE, where the decoded word is assembled bit by bit.

A register, called BITPNTR, used as a pointer to the individual bits of the ASSEMBLED MESSAGE register A single bit flag register, called POL FLAG, used to define the polarity of bits to assemble.

The rest of the method can be explained with reference to logic circuitry or programming into a microprocessor/microcontroller with equal results. The method is also relying on a status, able to adopt one of the 3 following states: REST, START, and RUN.

REST is the state corresponding to the period between messages, when the line is idle and the system awaits a Start Bit.

The START state is corresponding to the moment between the detection of the Start Bit falling edge and the next change in the signal (sometimes up to the Stop Bit in case all Data Bits are zero), or to the EOWTMR end-of-count.

The RUN state is following the START state, and corresponds to the moment between the next change on the signal once the START state was activated and the logical conclusion that all Data Bits are known, or to the EOWTMR end-of-count.

When the message is over and all bits are known, the state loops to REST.

At initialization (see INIT routine), EOWTMR is stopped, the system state is REST, and the input capture circuitry is allowed to detect falling edge signals only and generate interrupts.

When the input signal which was at rest state 12 is now falling to level 13, at moment 1, the capture hardware is activated and generates an interrupt.

The INPUT CAPTURE INTERRUPT routine is then called, performing the following operations:

Duplicate the value held in CAPTMR into CAPVAL, reset and start CAPTMR.

Because the current status is REST, EOWTMR is reloaded and allowed to count, the state is changed to START, BITPNTR is set to point to bit zero of ASSEMBLED MESSAGE, POL FLAG is reset, and the input capture circuitry is allowed to react on both polarities of the input signal. The system is now waiting for one of the two possible events: a change on the input signal, or the end-of-count of EOWTMR.

According to a first possibility, if no change to the input signal occurs, the EOWTMR reaches its end-of-count and the EOWTMR INTERRUPT routine is called. This routine executes the following operations: stop the EOWTMR, fill the bits of ASSEMBLED MESSAGE with the current POL FLAG value until the value of BITPNTR is bigger than the constant LAST (of value 17 in our application) expressing the last Data Bit in the message. After that, the ASSEMBLED MESSAGE, containing all zero value Data Bits, is saved for further processing, the STATE is defined as REST, and input capture is only allowed on falling edges of the input signal. The routine is then over.

The other possibility implies that the input signal changes at least one time before EOWTMR reaches its end-of-count. At this START state, the INPUT CAPTURE INTERRUPT routine, will execute the following steps: copy CAPTMR to CAPVAL, change the state from START to RUN, set the POL FLAG to 1, subtract to CAPVAL the value representing the duration of a Data Bit, represented as duration 15 and called TBIT. The remaining value is compared to TBIT. This leads to two possible routes: If smaller, it means that the first Data Bit 6, is at level 12, the bit in ASSEMBLED MESSAGE currently pointed to by BITPNTR is filled with the current value of POL FLAG which is one. BITPNTR is incremented, pointing now to the second Data Bit. POL FLAG is then inverted. The last part of the routine checks if BITPNTR is bigger than the constant LAST, which cannot be true at this point. However, if the value remaining in CAPVAL is bigger than TBIT, it means that at least the first Data Bit is equal to zero. In this case, the bit in ASSEMBLED MESSAGE currently pointed to by BITPNTR is loaded with the reverse of the value in POL FLAG. BITPNTR is incremented before looping back into the routine at the point where TBIT constant is once again subtracted from CAPVAL, leading to a new comparison and so on.

The whole system is based on comparisons between the value reported by a counter/timer CAPTMR over the duration of one or several bits, possibly including the start bit, and the remaining value after successive subtractions to determine how many bits of the same polarity where covered. The complementary mechanism assuring that the message recognition can not fall out of sync in case there are no transitions during the last bit or bits of the message, is done with another timer/counter EOWTMR. Its ideal duration is the point in time 3 equally distant in terms of percentage between the beginning 2 of the last Data Bit 7, and the end 4 of the Stop Bit 8. This point x is given by the following formula where y is the duration between moment 1 and 2, z is the duration between moment 1 and 4.

$$x = sqr(y \cdot z).$$

For ease of comparison, and according to the metrics used in the triple sampling example where the whole message had a duration of 160, the point 2 equates 140, and the point 4 equates 160. The formula then gives 149.6662955 . . . as the optimal duration for EOWTMR. This translates to a theoretical 6.9% of tolerance in clock variation compared to the +/−2% offered by the triple sampling method. Nevertheless, the effective tolerance is in fact given by the following formula:

$$x = T/M$$

where x is shown as duration 9 on the drawing, T is the duration of TBIT 15, and M is the duration comprised between points 1 and 4.

Continuing with the same metrics, the practical formula become x=5/160. The practical tolerance of the system to clock discrepancies is 5%, an improvement of 2.5 compared to the triple sampling method.

While the invention has been particularly shown and described with references to a preferred embodiment there of, it will be understood by those skilled in the art that the foregoing and other changes in form and details may be made therein without departing from the spirit and scope of the invention.

We claim:

1. A process for transmission of information between at least two devices according to which elements of information which are succeeding each other in a time sequence are passed along over an electrical or optical support, said elements of information being made of a packet of bits forming messages which comprise one or more data and/or addresses of the devices for which these data are intended, said process causing no interference with existing Universal Asynchronous Receiver/Transmitter (UART) based communication systems of the devices, and allowing nevertheless an increase of the amount of various distinct messages which a system is able to convey, the process comprising:
   generating a serial message coded by means of a time sequence of binary transitions called bits;
   reducing the time length of all bits in the message by changing the bits into shorter bits called "reduced bits", in order to insert additional bits whose half duration falls at the moment in time where binary transitions between unchanged bits occurred when no additional bits are inserted
   keeping the half duration point of all reduced data bits to the same place as they were in an unchanged message
   keeping the total duration of the serial message containing the additional bits identical to the total length of the unchanged message,
   the duration of data bits being reduced by 50% and the duration of start and stop bits being reduced by 25%.

2. A process according to claim 1 wherein the electrical or optical support is a cable.

3. A process according to claim 1 wherein the time sequence of binary transitions is implemented as a possible presence of a current flowing through the electrical support and having an OFF state and an ON state materialized with, respectively, an absence and the presence of a current through said electrical support.

4. A process according to claim 1 wherein the transmission of information is compliant in voltage and current with the Musical Instruments Digital Interface (MIDI) standard and the original data bits in an expanded message form a MIDI message.

5. A process according to claim 1 wherein in order to retrieve the content of the serial message, the transmission of information includes a signal which is triple sampled.

6. A process according to claim 1 wherein the transmission of information includes a signal and the content of the serial message is retrieved by comparing the changes in the signal against timing references.

7. A process according to claim 6 wherein there are two timer/counters, the first being restarted each time a level change is detected, the second being used in determining the end of the serial message in case there are no level changes to make the last bit or bits of the serial message.

8. An arrangement for a communication of information allowing a transmission of a larger quantity of information between at least two devices than according to a first communication standard, comprising:
   means for connecting a first device to a second device through an electrical support;
   means for causing a flow of information between the two devices as elements succeeding each other in time sequence on the electrical support and materialized by an absence and a presence of a current within the electrical support, said information being made of a packet of bits forming messages which comprise one or more data and/or addresses of the devices for which these data are intended,
   each device comprising an emitter section and a receiver section compatible with said first communication standard,
   means for coding said information both in said first communication standard and in a second enlarged communication standard
   said means for coding generating a serial message coded by means of a time sequence of binary transitions forming said bits, wherein said means for coding the second enlarged communication standard comprises a circuitry replacing a standard UART, said circuitry being able to modulate the flow of information in time in order to reduce the time length of all bits in the serial message by changing the bits into shorter bits, called "reduced bits", and in order to insert additional bits whose half duration falls at the moment in time where transitions between unchanged bits occurred according to the first communication standard when no additional bits are inserted, and means for reducing the duration of data bits by 50% and the duration of start and stop bits by 25%.

9. An arrangement for a communication of information allowing a transmission of a larger quantity of information between at least two devices than according to a first communication standard, comprising:
   means for connecting a first device to a second device through an electrical support;
   means for causing a flow of information between the two devices as elements succeeding each other in time sequence on the electrical support and materialized by an absence and a presence of a current within the electrical support, said information being made of a packet of bits forming messages which comprise one or more data and/or addresses of the devices for which these data are intended, each device comprising an emitter section and a receiver section compatible with said first communication standard, means for coding said information both in said first communication standard and in a second enlarged communication standard said means for coding generating a serial message coded by means of a time sequence of binary transitions forming said bits, wherein said means for coding the second enlarged communication standard comprises a circuitry replacing a standard UART, said circuitry being able to modulate the flow of information in time in order to reduce the time length of all bits in the said serial message by changing the bits into shorter bits, called "reduced bits", and in order to insert additional bits whose half duration falls at the moment in time where transitions between unchanged bits occurred according to the first communication standard when no additional bits are inserted, and wherein said first communication standard is according to the Musical Instruments Digital Interface (MIDI) standard.

* * * * *